Figure 7:
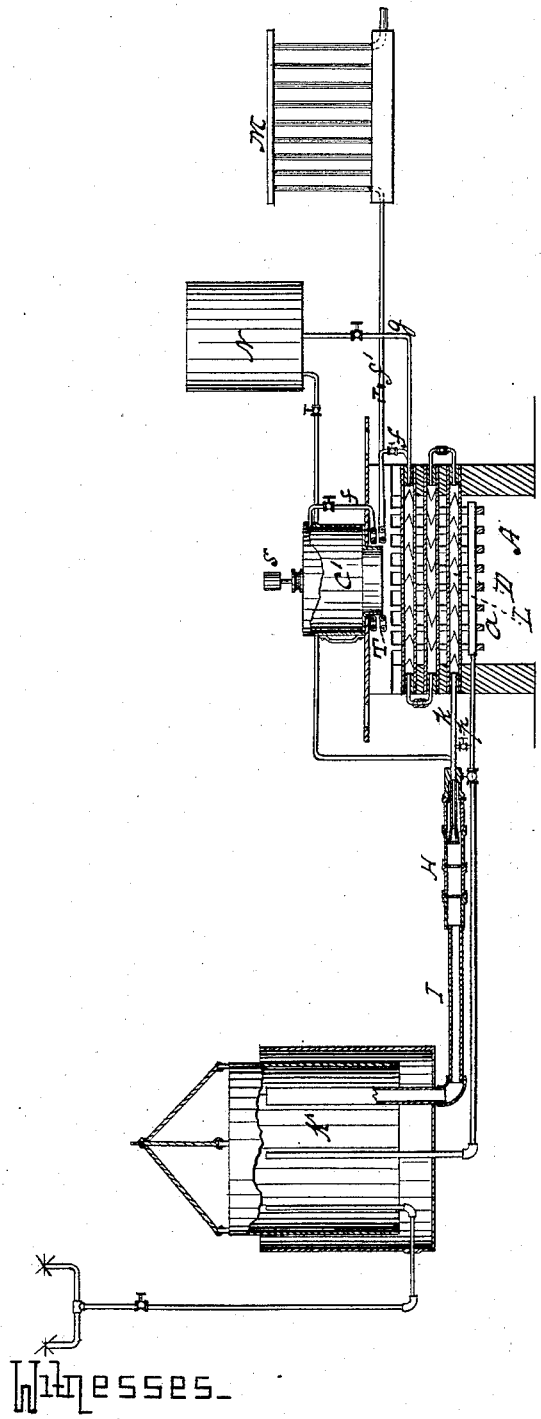

(No Model.) 3 Sheets—Sheet 1.
R. B. AVERY.
APPARATUS FOR THE MANUFACTURE OF VAPOROUS AND GASEOUS FUEL AND ILLUMINATING GAS.
No. 317,611. Patented May 12, 1885.
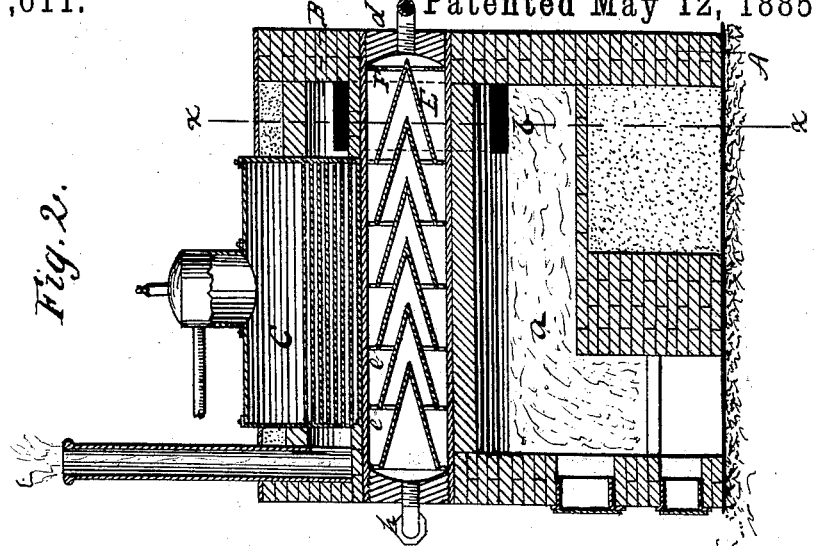
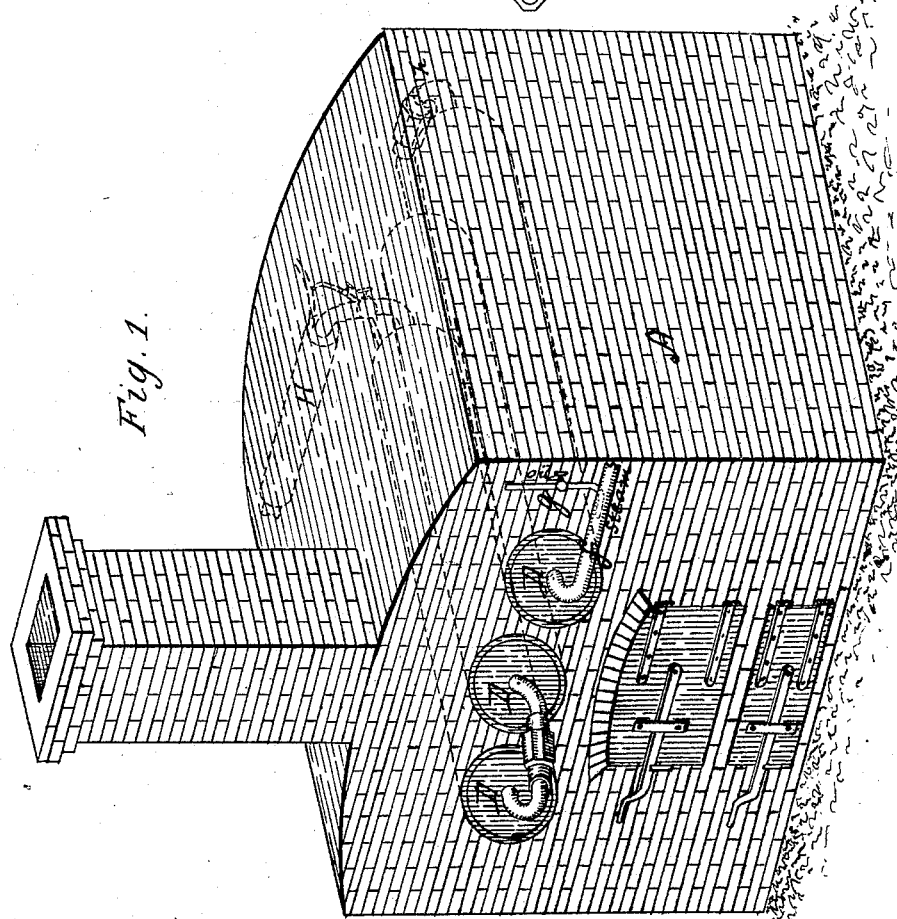
Witnesses
Inventor
Richard B. Avery
by F. W. Ritter Jr.
Atty (No Model.) 3 Sheets—Sheet 2.
R. B. AVERY.
APPARATUS FOR THE MANUFACTURE OF VAPOROUS AND GASEOUS
FUEL AND ILLUMINATING GAS.
No. 317,611. Patented May 12, 1885.
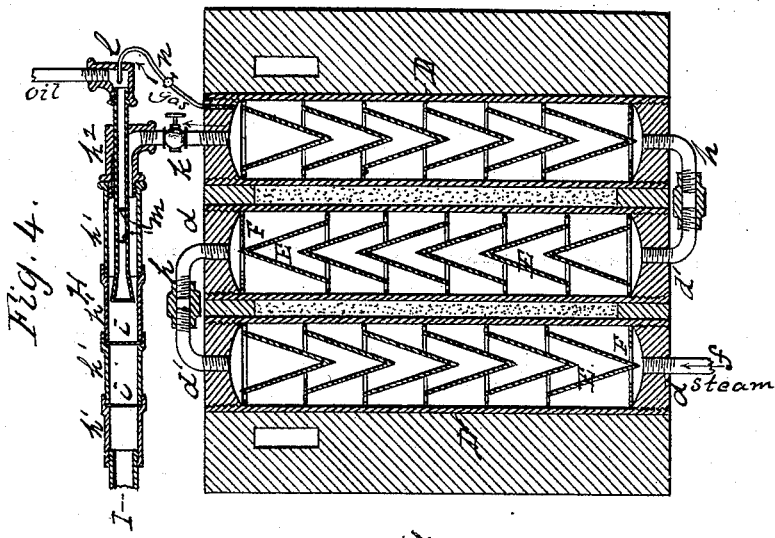
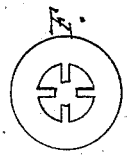
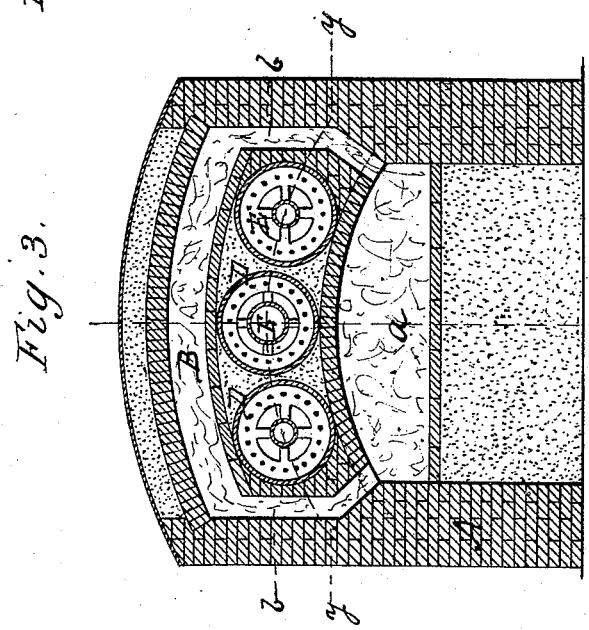
Witnesses
H. B. Moulton.
G. A. Tauberschmidt
Inventor
Richard B. Avery
by F. W. Ritter Jr
Atty (No Model.) 3 Sheets—Sheet 3.

R. B. AVERY.
APPARATUS FOR THE MANUFACTURE OF VAPOROUS AND GASEOUS FUEL AND ILLUMINATING GAS.

No. 317,611. Patented May 12, 1885.

Witnesses
H. B. Moulton
G. A. Tauberschmidt

Inventor
Richard B. Avery
by F. W. Ritter Jr
Atty

UNITED STATES PATENT OFFICE.

RICHARD B. AVERY, OF WASHINGTON, DISTRICT OF COLUMBIA.

APPARATUS FOR THE MANUFACTURE OF VAPOROUS AND GASEOUS FUEL AND ILLUMINATING-GAS.

SPECIFICATION forming part of Letters Patent No. 317,611, dated May 12, 1885.

Application filed June 7, 1884. (No model.)

*To all whom it may concern:*

Be it known that I, RICHARD B. AVERY, a citizen of the United States, residing at Washington city, in the District of Columbia, have invented certain new and useful Improvements in Apparatus for the Manufacture of Vaporous and Gaseous Fuel, Illuminating-Gas, &c.; and I hereby declare the following to be a full, clear, and exact description of the same, reference being had to the accompanying drawings, in which—

Figure 1 is a perspective view of the apparatus as adapted for the production of large volumes of gaseous or vaporous fuel for heating or illuminating purposes, the oil-reservoir and steam-generator employed therewith being omitted. Fig. 2 is a longitudinal vertical section of the same, with the addition of a steam-generator located in the same furnace over the retorts. Fig. 3 is a vertical transverse section on the line $x\,x$, Fig. 2, showing the arrangement of the flues for products of combustion. Fig. 4 is a horizontal section on the line $y\,y$, Fig. 3, showing the interior of the retorts, their arrangement, construction, and connections. Fig. 5 is a view of the base of one of the cone-deflectors which are arranged in the retorts. Fig. 6 is a detached view of the end disks or spiders. Fig. 7 is a sectional view showing the retorts arranged in a system for domestic lighting and heating.

Like letters refer to like parts wherever they occur.

My present invention relates to the construction of apparatus for the manufacture of vaporous and gaseous fuels and illuminants, and has for its object to simplify the construction and render it more efficient.

Experience has demonstrated that the retort system is by far the most desirable one for manufacturing heating and illuminating gas from steam, hydrocarbons, &c.; but it nevertheless has its drawbacks in that the gases are inclined to pass through the retorts in a body or column so as to be unequally heated or retorted, so that the resultant gaseous products lack uniformity as fixed gases. To overcome these objections, the retorts have been filled with broken brick, deflectors of various forms, perforated disks, and many other devices, some of which, though simple and inexpensive in themselves, are nevertheless costly, inasmuch as they reduce the capacity of the retort and facilitate the formation of fixed carbon, with consequent loss of fuel, while others are complicated in character, more or less costly, and not only add to the first cost of apparatus, but are difficult to maintain and keep in operative condition. To obtain the best results there are three points to be attended to in the construction of the devices employed: first, to cause the gases or admixture of steam and hydrocarbons to pass in a thin sheet next to the walls or most highly-heated parts of the retort. This I accomplish by the conical form of the deflectors; secondly, to break up this sheet from time to time into fine jets, so as to cause the intimate intermingling of the steam and hydrocarbons while maintained at a high heat. This I accomplish by arranging between the conical deflectors perforated diaphragms; and, thirdly, to obstruct the retort as little as possible, so as to allow for the expansion of the gases and to avoid undue pressure in the retorts, and this I accomplish by making my deflectors hollow and of such form that they can be nested. Whatever construction will accomplish this falls within the scope of the main feature of my present invention, though its preferred embodiment is that shown in the drawings—viz., hollow cones having perforated flanges and arranged at intervals within the retort, so that the apex of one cone shall enter the base of the preceding one.

As the objects to be attained in steam-superheaters are in a great measure those above recited, it is evident that the construction is adapted to superheaters, and the scope of the invention is hereby made to include superheaters.

There are other and minor points of invention, which will hereinafter more fully appear.

I will now proceed to describe my invention more fully, so that others skilled in the art to which it appertains may apply the same.

In the drawings, A indicates the walls of a furnace, within which the retorts may be set for manufacturing purposes, and if an ordinary fire is to be employed for heating the retorts, there will be the usual fire-chamber, $a$, with its grate, connected by flues $b$ with the flue B above the retorts and leading to the stack. An independent steam-generator may be used; but for sake of economy it will sometimes be found desirable to set a tubular boiler, C, in the flue B, which leads to the stack, as shown in Fig. 2 of the drawings.

D indicates the retorts, any number of which may be employed, three being chosen for purposes of illustration, and the special form of these retorts is immaterial, though cylindrical retorts are preferable. The retorts may be cast or otherwise formed with one head attached or integral with the body; but I prefer to make the body of the retorts D cylindrical, as shown, and secure in each end a detachable head, $d$ $d'$, provided with an induction or eduction pipe, as the case may be.

E indicates a hollow deflecting cone, whose base is slightly less than the interior diameter of the retort, and provided with a flange of substantially the interior diameter of the retort, so as to form a diaphragm between the base of the cone and the retort, which diaphragm or flange is perforated, as at $e$, to permit the passage of the gas in fine streams only. At the base of the cone and projecting inward are a series of lugs, $e'$, which form a spider to support the entering apex of the succeeding cone when the cones are arranged in series. In order to support the apex of the first cone of the series, a spider-disk, F, (see Fig. 6,) is provided.

In setting up the devices the head $d$ at the receiving end of the retort may be inserted or attached, the spider F placed against it, and the first or leading cone, E, inserted, with its apex entering and supported by the spider F, after which the several cones E are introduced in succession, the apex of the following cone entering the hollow base of the preceding cone, and being supported by the lugs $e'$ or spider thereof. When the last cone E is introduced, the discharging-head $d'$ is inserted or attached. One or any desired number of these retorts may be employed, and a description of one applies to all. I usually arrange them in sets of three or more, as shown in the drawings, the receiving-head $d$ of the first retort being provided with a steam-induction pipe, $f$, which opens opposite the apex of the first cone, and into said steam-pipe delivers an oil-pipe, $g$, which leads to any suitable reservoir or source of supply. The retorts are alternately reversed, so that the receiving-head $d$ of one retort is adjacent to the delivery or discharging head $d'$ of the next retort, and the two retorts are then coupled by a connecting-pipe, $h$.

The devices thus far described are effective for the manufacture of either heating or illuminating gas, the character of the gas being dependent on the amount of hydrocarbon introduced through pipe $g$; but I prefer to use them only for the manufacture of heating-gas, obtaining my illuminating-gas by adding to the heating-gas, while intensely hot, an additional per cent. of hydrocarbon after the gas leaves the final retort, and for this purpose I employ the devices which I will next describe. Adjacent to the final retort of the series I place a combining or carbureting chamber H, from which a pipe, I, leads to the gasometer or storage-tank. This carbureting or combining chamber H may be a pipe of large diameter, or of a series of sections, $h'$, divided by perforated diaphragms $i$ and closed by a head, $h^2$, into which the discharge-pipe (or eduction-pipe) $k$ of the last retort delivers.

Arranged in the head $h^2$ is a short tube or oil-injector, $l$, also provided with perforated diaphragms $m$ and terminating in a perforated rose-nozzle. This oil-injector is connected with the oil-supply by a suitable pipe, and also with the retort D by a small gas-pipe, $n$, so that a jet of gas may be used to inject the oil into the carbureting-chamber H.

Before describing the operation of these devices I will show how they may be adapted for domestic use, and for that purpose refer to Fig. 7, in which A indicates a range or stove in the fire-chamber $a$ of which the retorts D (constructed as before described) are arranged. At the back of the stove and over the retorts is placed a boiler, C', provided with a safety-valve, $s$, and from said boiler the steam-pipe $f$ leads down into a superheater, T, (preferably a coil,) and thence to the head of the first retort, D, a branch pipe, $f'$, leading off to a steam-heater, M, if desired.

N is the oil-reservoir, the oil pipe $g$ of which delivers into the steam-pipe $f$, leading to the retort D. The discharge or eduction pipe $k$ from the last retort delivers into the carbureting-chamber H, and the pipe I conducts the illuminating-gas to the storage-chamber of gasometer K.

In order to start the fire, a supply-pipe from the gasometer K leads to the burner L, arranged in the fire-chamber $a$, of the stove or range; but as for heating purposes the gas is equally efficient, if not better, before it has been carbureted, a branch pipe, $p$, connects the burner with the pipe $k$, so as to take the supply for the burner from the retort direct when the apparatus is in operation.

I will now describe the operation of my devices. Fire having been started in the fire-chamber of the furnace or stove, so as to properly heat the retorts and generate steam, the steam is admitted to the retorts through pipe $f$, charged with oil admitted through pipe $g$. The admixture of oil and steam strikes the apex of the first cone and is spread out in a thin annular or hollow column, which hugs the walls of the retort, where the heat is the greatest, until it strikes the diaphragm $e$, which divides it into fine streams, facilitating the admixture of the steam and oil or oil-vapors. The fine streams reunite or coalesce again in the space between the diaphragms and the sheet continues to hug the walls of the retort D, any back pressure being accommodated by the hollow cones E, until the succeeding diaphragm is reached, when the sheet is again divided up into fine streams, and so on through all the diaphragms and all the retorts of the series. It will be noted that not only is the gas when in thin sheets caused to hug the walls of the retort, but also when it is divided into fine streams, and as a consequence a uniform gas is obtained, as every particle of the gas is subjected to an equal heat. The gas from the last retort passes to carbureting-chamber H, first, a small jet by pipe $n$ to the injector inducing the flow of oil, mingling therewith, and atomizing the oil as it passes through the perforated diaphragms $m$ of the injector $l$, and then the oil thus atomized meets the body of gas which enters the carbureting-chamber through pipe $k$, and the whole is intimately blended by passing through the perforated diaphragms $h^2$ before reaching the gasometer K or point of utilization.

Having thus described the nature, operation, and advantages of my invention, what I claim, and desire to secure by Letters Patent, is—

1. In apparatus for the manufacture of gas, superheating steam, and like purposes, the combination, with a retort, of a series of cones, arranged with their apices in the same direction, and interposed perforated diaphragms, substantially as and for the purposes specified.

2. In apparatus for the manufacture of gas, superheating steam, and like purposes, the combination, with a retort, of a series of hollow cones having perforated flanges and arranged so that the apex of each cone enters the base of the preceding cone, substantially as and for the purposes specified.

3. The combination of two or more retorts, each provided with a series of conical deflectors and interposed perforated diaphragms, said retorts reversely arranged and coupled by a connecting-pipe, substantially as and for the purposes specified.

4. In apparatus for the manufacture of gas, the combination, with a retort, of a carbureting-chamber provided with perforated diaphragms, a pipe for delivering the body of gas from the retort directly into the carbureting-chamber, and an oil-induction pipe having perforated diaphragms, which deliver the oil to the carbureting-chamber in a finely-divided condition, substantially as and for the purposes specified.

5. In apparatus for the manufacture of gas, the combination, with a retort, of a carbureting-chamber having perforated diaphragms and connected with the retort so as to receive the body of gas directly therefrom, and the oil-injecting nozzle, also provided with perforated diaphragms and connected with the retort by a jet-pipe, substantially as and for the purposes specified.

6. The deflector for superheaters, retorts, &c., consisting of the hollow cone having a perforated base-flange, substantially as and for the purposes specified.

7. The deflector for gas-retorts, superheaters, &c., consisting of the hollow cone having a perforated base-flange and an internal spider or supporting-lugs, substantially as and for the purposes specified.

8. In apparatus for the manufacture of gas, the carbureting-chamber having in its interior a series of perforated diaphragms, an oil-induction pipe having one or more perforated diaphragms, said oil-pipe extending longitudinally into the carbureting-chamber, and a retort connected with the carbureting-chamber at or near the point of insertion of the oil-pipe, substantially as and for the purposes specified.

In testimony whereof I affix my signature, in presence of two witnesses, this 4th day of June, 1884.

RICHARD B. AVERY.

Witnesses:
JACK BROWN,
JAS. E. WELLS.